United States Patent [19]
Colombo

[11] Patent Number: 5,473,978
[45] Date of Patent: Dec. 12, 1995

[54] METHOD FOR THE TRANSIT OF SMALL OBJECTS WITHIN TREATMENT CHAMBERS, AND MEANS FOR ITS IMPLEMENTATION

[75] Inventor: Pier G. Colombo, Treviglio, Italy

[73] Assignee: Colombo Filippetti S.r.l., Bergamo, Italy

[21] Appl. No.: 214,798

[22] Filed: Mar. 16, 1994

Related U.S. Application Data

[62] Division of Ser. No. 954,376, Sep. 30, 1992, abandoned.

[30] Foreign Application Priority Data

Feb. 24, 1992 [IT] Italy ................... BG92A0008

[51] Int. Cl.$^6$ ............... B65G 37/00; B65G 47/00
[52] U.S. Cl. ............ 99/443 C; 99/477; 198/347.1; 198/465.3; 414/150; 414/795.1
[58] Field of Search ................... 99/386, 443 C, 99/477; 198/347.1, 465.1, 465.3, 721, 797; 414/150, 152, 154, 158, 331, 795.1, 797.7

[56] References Cited

U.S. PATENT DOCUMENTS

| | | | |
|---|---|---|---|
| 2,029,303 | 2/1936 | Ball | 426/401 |
| 2,392,395 | 1/1946 | Lehman | 426/401 |
| 2,717,548 | 9/1955 | Blair, Jr. | 198/721 |
| 3,927,976 | 12/1975 | Reimers et al. | 426/523 |
| 3,993,189 | 11/1976 | Khoylian | 198/465.3 |
| 4,077,528 | 3/1978 | Santen | 414/152 |
| 4,109,568 | 8/1978 | Herrera | 99/477 |
| 4,171,739 | 10/1979 | Yamato | 99/443 C |
| 4,346,650 | 8/1982 | Zaitsu | 426/407 |
| 4,385,035 | 5/1983 | Akitoshi et al. | 426/407 |
| 4,533,515 | 8/1985 | Witter et al. | 426/401 |
| 4,548,130 | 10/1985 | Diener | 99/443 C |
| 4,627,530 | 12/1986 | Franke | 198/799 |
| 4,633,998 | 1/1987 | Norfolk | 198/465.3 |
| 4,784,053 | 11/1988 | Barnhart | 426/407 |
| 4,890,718 | 1/1990 | Colamussi | 198/465.3 |
| 4,950,120 | 8/1990 | Barnes | 414/797.7 |
| 5,064,093 | 11/1991 | Davis | 414/797.7 |
| 5,203,256 | 4/1993 | Mueller | 99/443 C |
| 5,253,743 | 10/1993 | Haas, Sr. | 198/347.1 |
| 5,359,834 | 11/1994 | Holdensgaard | 198/465.1 |

FOREIGN PATENT DOCUMENTS

| | | | |
|---|---|---|---|
| 616240 | 3/1961 | Canada | 99/443 C |
| 1218342 | 5/1960 | France | 198/465.1 |
| 1338829 | 9/1987 | U.S.S.R. | 99/443 C |

Primary Examiner—David Scherbel
Assistant Examiner—Randall E. Chin
Attorney, Agent, or Firm—Steinberg, Raskin & Davidson

[57] ABSTRACT

An apparatus for the transit of objects within treatment chambers including at least one support trolley for supporting food products and having lifting elements arranged at its longitudinal ends. The trolley includes a plurality of links aligned with and articulated to each other in the longitudinal direction. The trolleys can be used either in a closed or an open cycle operation. The trolleys are articulated in a manner which enables them to remain rigid during stages in which they cooperate with at least four projecting pins which are driven vertically by acting as lead pins torsionally rigid with a fixed structure and engaged with respective rotating vertical screws. The articulation of the trolleys also enables the trolleys to turn about end toothed wheels which upon rotation cause movement of the trolleys in a longitudinal movement.

23 Claims, 7 Drawing Sheets

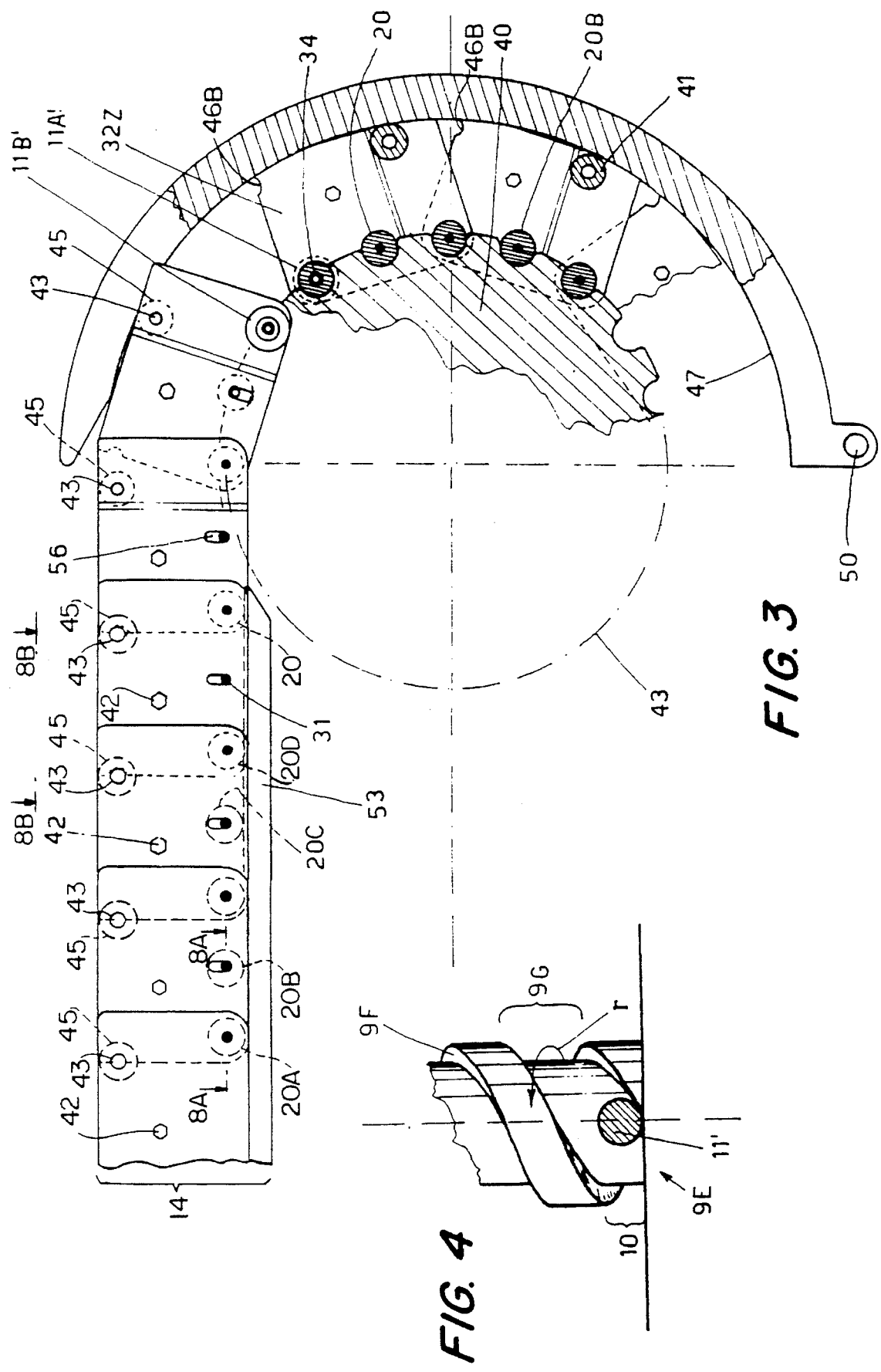

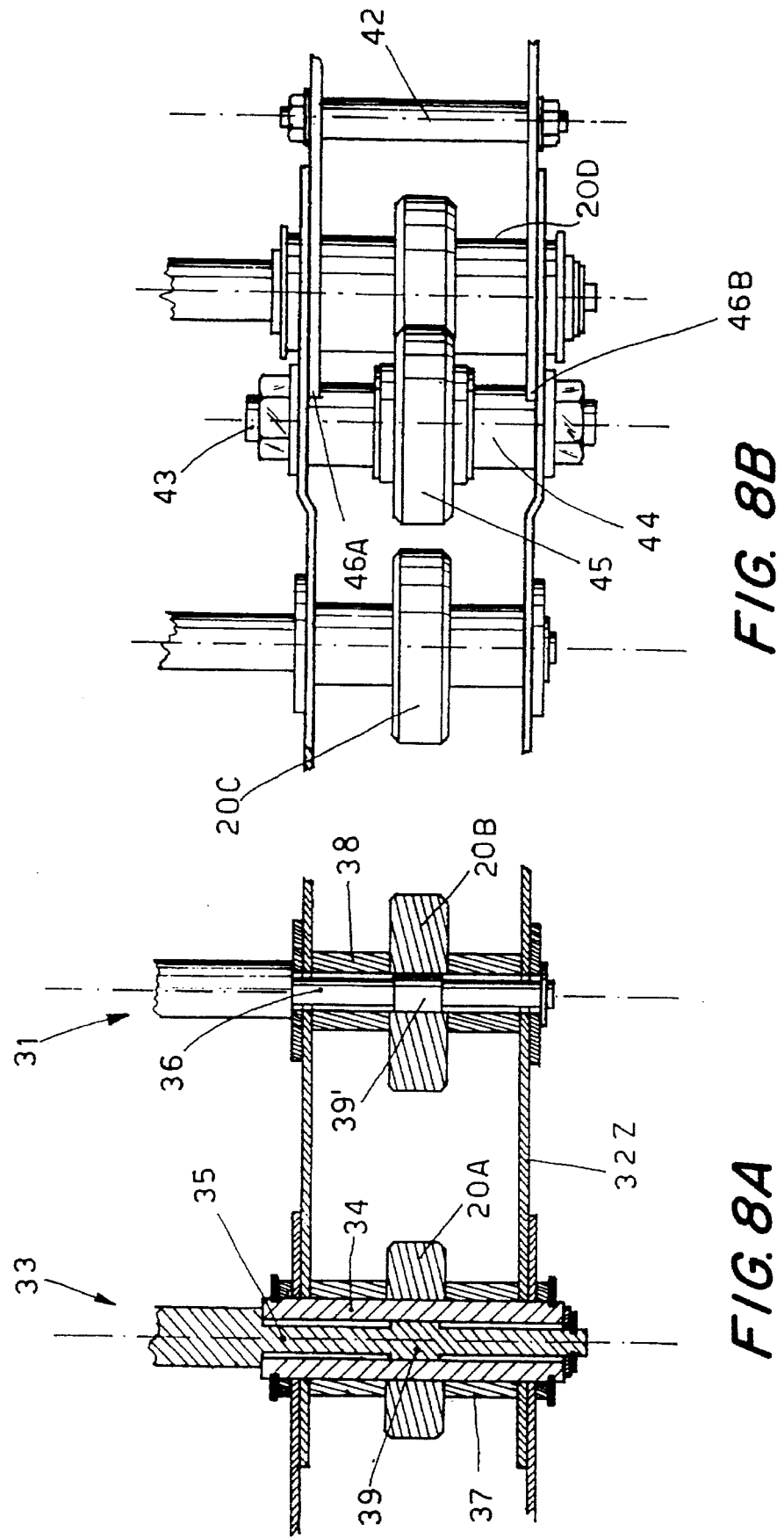

5,473,978

METHOD FOR THE TRANSIT OF SMALL OBJECTS WITHIN TREATMENT CHAMBERS, AND MEANS FOR ITS IMPLEMENTATION

This is a division of application Ser. No. 07/954,376, filed Sep. 30, 1992, now abandoned.

BACKGROUND OF THE INVENTION

This invention relates to methods for moving objects or foods within treatment chambers.

A large number of situations are known to exist in which eatable or non-eatable objects have to be placed in treatment chambers for their cooking, leavening, cooling, heating, dehydration, irradiation and/or technical treatment.

There are also situations in which certain products have to be treated with electromagnetic, sterilizing or anti-sprouting radiation.

In such situations, a given object has always substantially been transferred from usual environmental conditions into a treatment chamber by means of a transit vehicle, undergo the required heating or treatment, and finally emerge into the environment where it is withdrawn for use or for packaging.

These steps are currently achieved in various ways, of which the following are the most typical, and enable the object or product to be regulated by residing for the time required to reach the exit, it being loaded and discharged continuously. The most simple is the tunnel method by which the product is rested on a conveyor belt or the like which passes through a treatment chamber, receiving its load before entering, to discharge it after it has left the tunnel.

This method has the drawback of a considerable longitudinal space requirement associated with a considerable radiant surface which makes it difficult to maintain the required temperature. An improvement in this method is to use two overlying conveyor belts sliding in opposite directions to enable the objects conveyed by the upper entry belt to fall onto the lower belt which conveys it to the exit. This method is however applicable only to products which can be processed in loose form.

There is also the tower method by which the product is made to travel through a path in the form of a cylindrical helix of vertical axis until it leaves from the top.

This method has the drawback of not using the total volume of the treatment chamber in that the helical curvature of the articulated belt leaves a central air column free. When conveyed to the top the product has to be made to again descend to the operating floor level by chutes which generally endanger the shape of the product and prevent a hypothetical precise order or location of the various objects or products from being maintained.

If the objects or products have to be handled in a predetermined arrangement on specific trays, these trays must be stacked on trolleys provided for transporting them and maintaining them within the treatment chamber for the required time.

This latter method is a batch method and creates problems connected with the required operational continuity of the processing necessary downstream of the thermal cycle.

Methods for handling such products currently exist based on the use of flexible trays formed from thin metal sheet, but these have the drawback of having to always operate with outer longitudinal bars to provide them with the stiffness necessary for them to transport or support the products.

OBJECTS AND SUMMARY OF THE INVENTION

An object of the present invention is to define a method by which products, particularly food products, can be treated for example thermally in a manner which is substantially continuous.

A further object is to define a method of the aforesaid type which enables products requiring predetermined relative positioning to be treated for example thermally.

A further object is to define a method of the aforesaid type by which the products are transported smoothly such as to ensure their soundness even if very delicate or fragile.

A further object is to define a method of the aforesaid type which allows practically complete utilization of the treatment chamber.

A further object is to define a method which allows the same equipment or means to be used for loose products and for prearranged products.

A further object is to define support means for the products or objects which can be used in both closed and open cycle.

A further object is to define transport means of total reliability and considerable operating precision.

A further object is to define trays having an inherent rigidity suitable for their transport.

A further object is to define trays which can act as pallets.

A further object is to define product handling means which are essentially mechanical such as to reduce the need for pneumatic or hydraulic actuators and hence not contaminate any treated food products.

These and further objects will be seen to be attained on reading the following detailed description of a method for the transit of small objects within treatment chambers having the characteristic of allowing the objects to be thermally treated without subjecting them to movement relative to their support means and at the same time allowing a small-volume treatment chamber to be used which is totally filled, said method allowing the same support means to be used for closed and/or open cycle operation.

The means which implement the aforesaid method have the characteristic of consisting of object support trolleys or trays articulated in a manner which enables them to remain rigid during stages in which they cooperate with four projecting pins which are driven vertically by acting as torsionally rigid lead pins engaged with respective rotating vertical screws, and further enables them to turn about end toothed wheels, at least one of the toothed wheels engaging with each support trolley or tray at any given time, such that upon rotation of the toothed wheels, the support trolleys or trays are moved in a horizontal direction when they are not being moved in a vertical direction by the rotating vertical screws.

BRIEF DESCRIPTION OF THE DRAWINGS

The invention is illustrated by way of non-limiting example on the accompanying drawings, in which:

FIG. 3 shows schematically the ends of two adjacent trays in their curved configuration deriving from their articulation about the round part of an end drive wheel for a crawler-type track; of these tray ends, the tray end more to the right is shown in section on a plane passing through the toothed drive wheel;

FIG. 4 shows a rotary screw associated with one of the projecting pins of the tray, this pin, shown sectioned, acting as a lead pin and being radial to the screw;

FIG. 8A is a sectional view taken along the line 8A—8A of FIG. 3.

FIG. 8B is a top view of the section 8B—8B seen in FIG. 3.

DETAILED DESCRIPTION OF THE INVENTION

Figure 1:
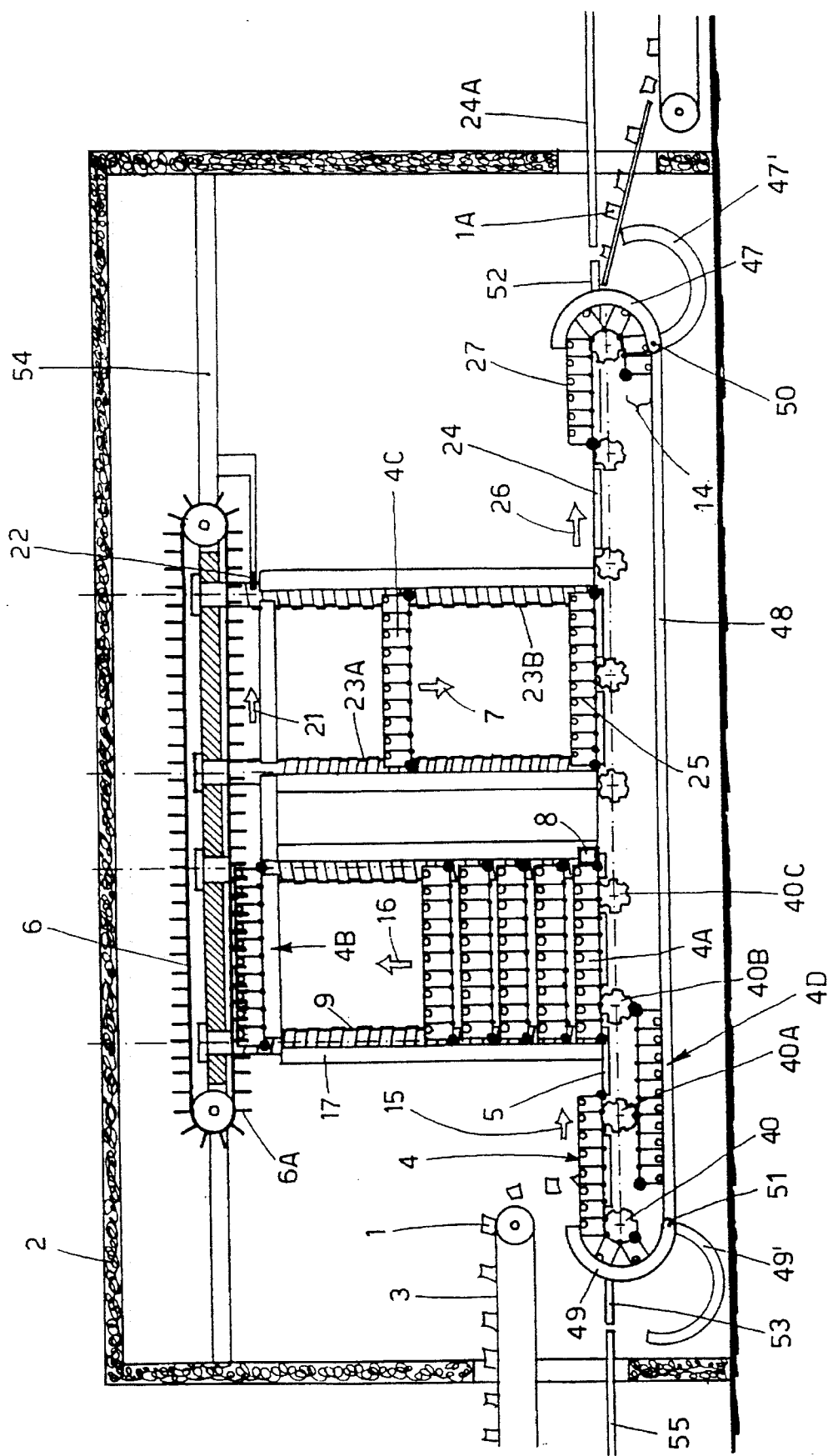
FIG. 1 is a schematic view of a treatment or technological chamber within which means operate for moving the objects under thermal and/or technological treatment; for reasons of clarity the figure shows a chamber with empty spaces, in contrast to the intrinsic concept of the invention.

With particular reference to FIG. 1, objects 1 (or pieces or packages of food products) enter a treatment chamber 2, remain in it for the time required for their treatment (cooking, leavening, cooling, heating, dehydration, irradiation and/or thermal treatment), and finally leave it as treated products 1A ready for use. Their entry into the treatment chamber 2 can be achieved in various known ways, of which a feed belt 3 shown for this purpose represents a simple example.

Figure 6:
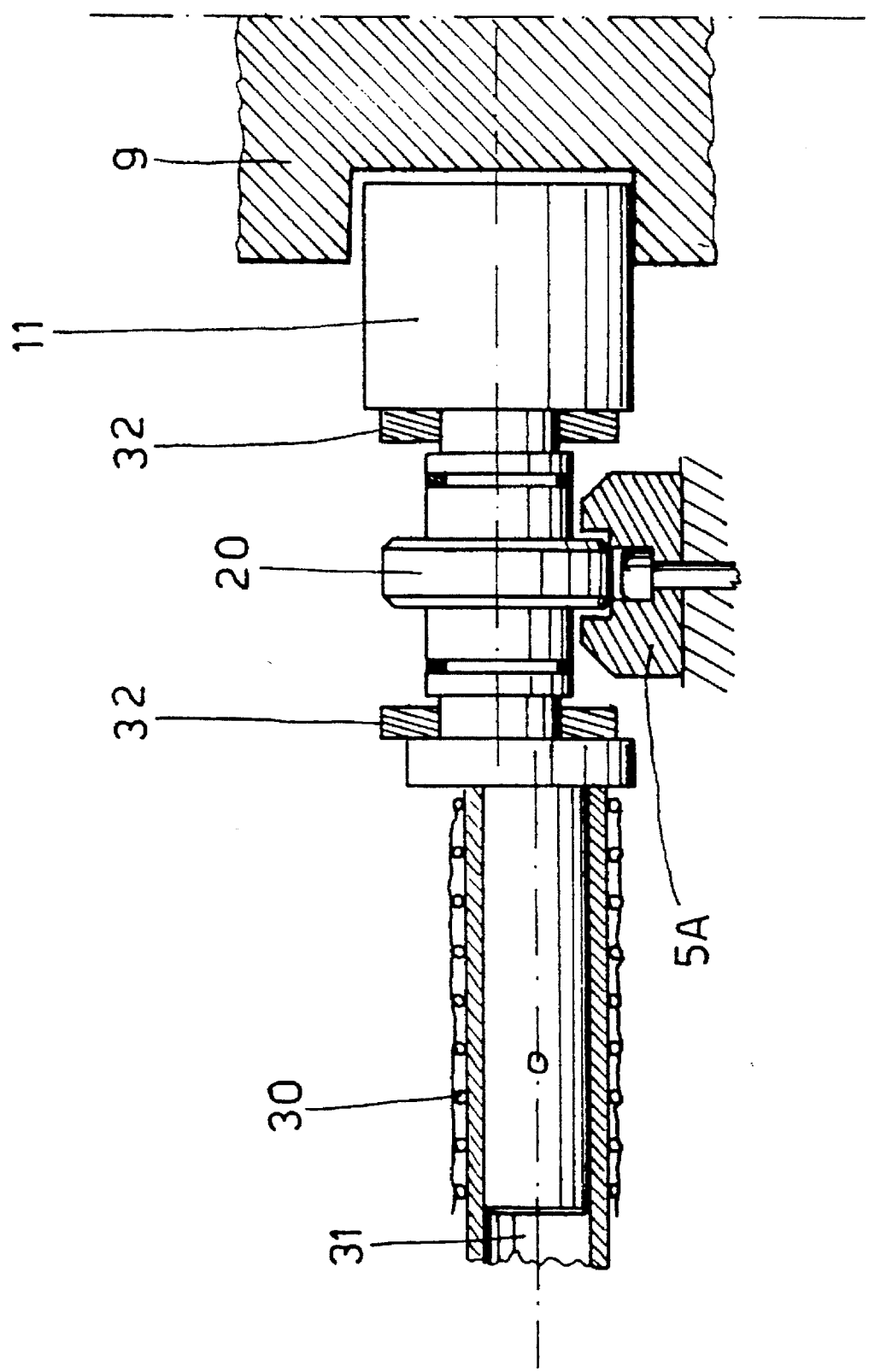
FIG. 6 is a constructional example of a pin projecting into a helical groove of a screw, shown only as far as its longitudinal axis.

A trolley 4, represented by a product support tray, is loaded with the required objects 1 in a position at the extreme left, with reference to the drawing. The tray or trolley 4 slides supported by straight rails 5, which also guide it by means of their channel cross-section (5A in FIG. 6) in which the wheels 20 of the trolley rotate. In FIG. 1 these wheels are represented by black dots.

The trolley 4 can be driven by known means, such as by a chain of the type indicated by 6, consisting of links provided with dragging projections 6A, or by toothed wheels 40, 40A, 40B, 40C, spaced apart by a length less than that of the trolley to form a continuity of engagement with at least one of a plurality of wheels 20 which form parts of the trolley 4 (which will be discussed in greater detail below) and which are spaced apart by the same distance as the teeth.

By this means, the trolley 4 reaches a position which in FIG. 1 is occupied by the trolley 4A. This position is defined by limit stops 8 (see also 8A in FIG. 2) positioned on the two travel rails 5, or on a fixed structure of the system.

Figure 2:
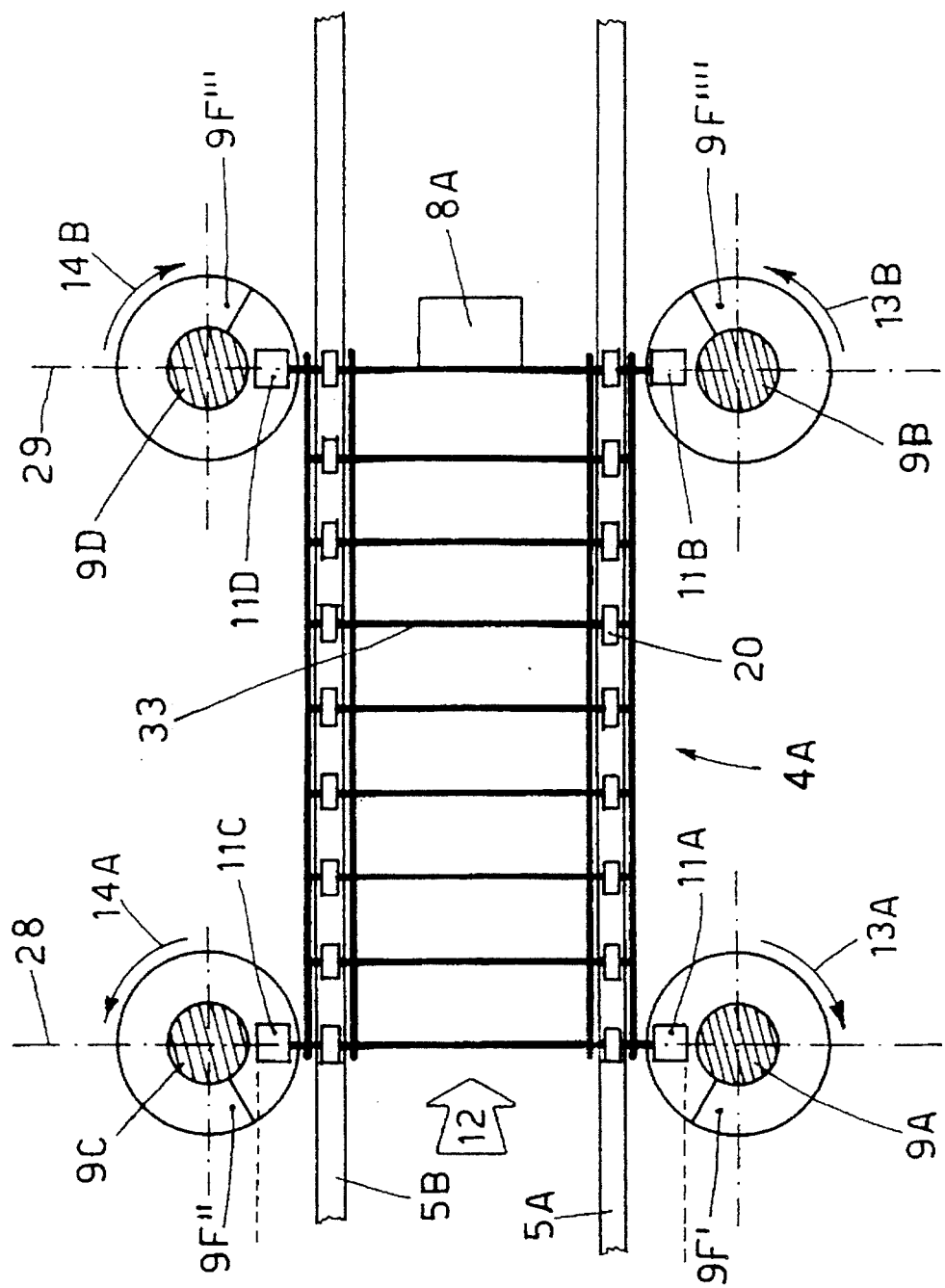
FIG. 2 is a schematic view of the interior of a treatment chamber viewed from above, to show the method of operation of four screw columns with respect to a tray positioned between them.

These stops enable the correct positioning of the trolley 4A to be established directly or indirectly, to as a consequence cause the four columns 9 to rotate about their axis, these being indicated in FIG. 2 By 9A, 9B, 9C, 9D.

The columns 9 comprise a helical groove (9G in FIG. 4), so that they could be considered substantially as screws.

Said helically grooved columns 9 are connected together positively by usual gearwheels, link chains or toothed belts. Screws 9A,9B,9C and 9D are mounted for rotation at a top part thereof in connection with a member 54.

They all rotate at the same speed and cooperate in pairs formed by one column with a right handed helical groove and another column with a left handed helical groove.

Said columns 9 are synchronized and driven by usual geared motors in such a manner as to undergo only complete revolutions, one or more in number, starting from a specific angular position which enables their base end 9E to present a mouth 10 which enables pins or lifting elements 11A, 11B, 11C, 11D (in FIG. 2) or 11' (in FIG. 4) projecting from the trolley 4 (4A in FIG. 2) to lie against a respective inclined surface 9F (FIG. 4) formed by the edges of said helical grooves 9G.

The base mouths 10 at the ends 9E must be of such a width as to enable the projecting pins 11 (11' in FIG. 4) of the various equal trolleys 4 (4A) to attain a position radial to their respective columns 9 after a horizontal movement 15 along rails 5A, 5B (FIG. 2), i.e., upon reaching the abutment 8A, a horizontal axis 28 of the projecting pins 11A and 11C and a horizontal axis of the projecting pins 11B and 11D of the trolleys 4 are positioned to coincide with a radius of the columns 9A, 9C, 9B and 9D, respectively.

This is more apparent from FIG. 2, in which an arrow 12 indicates the direction in which the trolley 4A has moved to be halted by the limit stops 8A and to consequently place its projecting pins 11A, 11B, 11C, 11D in a position radial to the rotating columns 9A, 9B, 9C, 9D.

In this manner the inclined surfaces 9F', 9F'', 9F''', 9F'''' (FIG. 2) move against the projecting pins 11 in opposite directions 13A, 13B and 14A, 14B, which balance each other so that the trolley 4A does not move on its wheels 20 i.e., each pin 11A,11B,11C and 11D of the trolley 4 is engaged by a respective screw at the same radial location, preferably at ends of the screws as shown in FIG. 4, so that each corner of the trolley 4 proximate the pins is moved in a vertical direction by the same amount and the trolley is thus provided with a balanced vertical movement.

Having reached the central position shown in FIG. 2, this being determined by a proximity sensor (which could be incorporated into the limit stop 8A), the four columns 9 begin to rotate in the directions 13A, 13B, 14A, 14B, to cause the trolley or tray 4A, positioned between them, to rise through a certain height, determined by the helical pitch of the grooves and the number of complete revolutions undergone.

This height corresponds to a height slightly greater than the height 14 (FIG. 3) of each trolley.

In this manner the trolleys 4, 4A are raised intermittently as shown by the arrow 16 (FIG. 1) to enable a new trolley 4 travelling in the direction 15 to be gripped by the four columns 9. Between the four columns 9A, 9B, 9C, 9D (forming the corners of an imaginary rectangle) a plurality of trolleys 4 form in layers, to define a certain layered flow. This is achieved in that for each trolley withdrawn from its support rails 5, a further trolley is removed from the stack of trolleys created by the ascending movement imposed by the rotation of the four columns 9A, 9B, 9C, 9D.

The trolley removed is that at the top of said stack, which in FIG. 1 is the trolley indicated by 4B.

Figure 5:
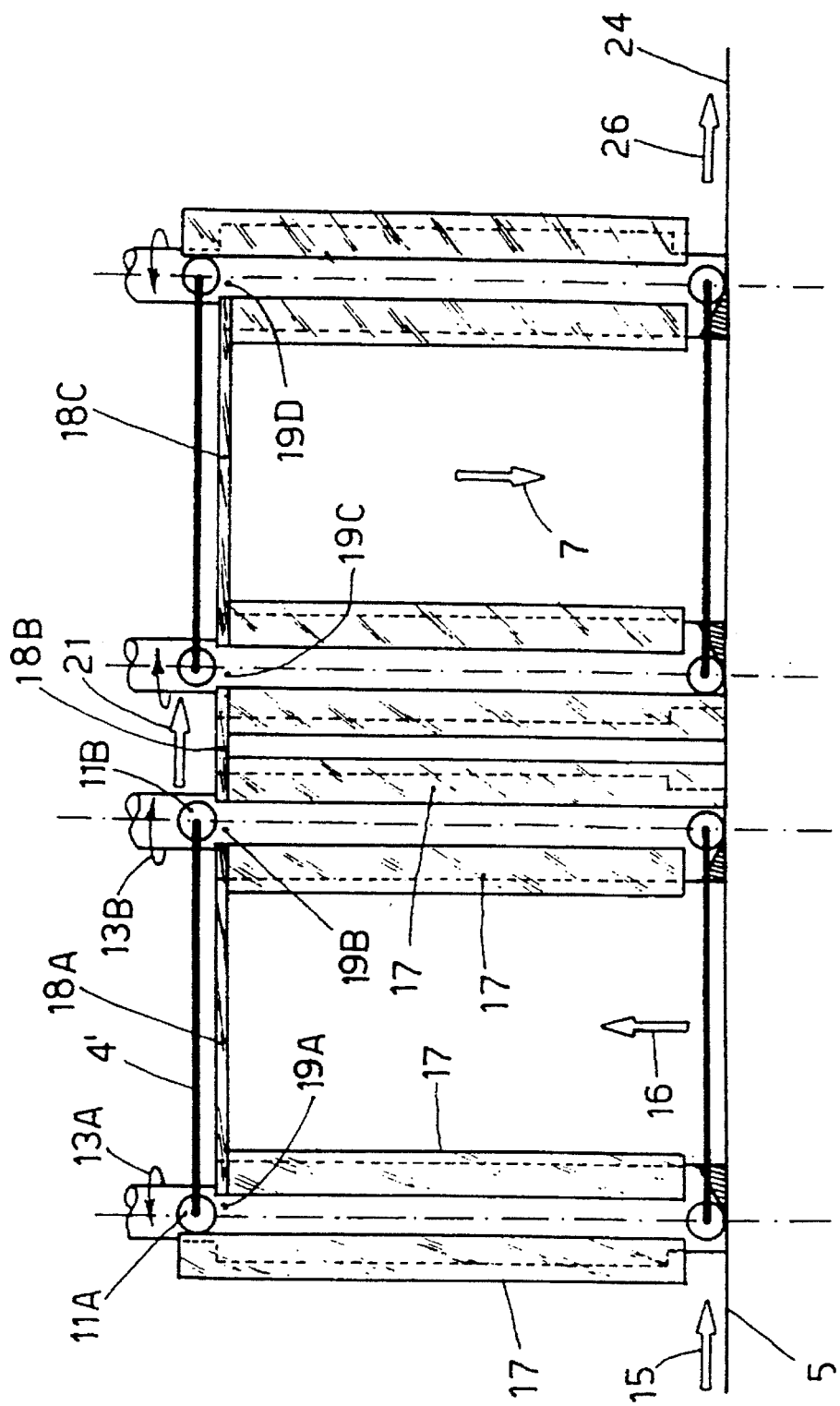
FIG. 5 shows schematically the movement of the trays in relation to two groups of rotary screws.

The upward movement 16 of the trolleys is guided by jibs 17 (FIG. 5), with the edges of which said projecting pins 11A, 11B, 11C, 11D cooperate. Alternatively this vertical movement can be guided by a vertical extension of the straight horizontal rails 5, and hence by the wheels 20 cooperating with said rails 5. FIG. 8 shows an example of the correct dimensioning of the parts. From FIG. 5 it can be seen that horizontal tracks 18A, 18B, 18C are provided at the top of the jibs. These lateral tracks are provided on each of the two sides of the upward and downward drive structures formed by the two groups of rotating columns.

It can also be seen that the tracks 18 are separated by gaps 19A, 19B, 19C, 19D to enable the projecting pins 11A, 11B to reach a level higher than them.

By rising to the position of the trolley 4B (or 4' in FIG. 5), transverse grippers (such as wheels, FIG. 3) on the various trolleys arrive in front of the short vertical projecting arms 6A (FIG. 1) forming part of the links of the top chain 6. As this chain slides, said arms 6A drag the trolley 4B in the direction along the upper rails 18A, 18B, 18C to a position determined by a horizontal upper stop 22 (FIG. 1), basically similar to the limit stop 8.

In this manner, the trolley arrives with its projecting pins 11 radial to the vertical columns 23A, 23B (identical to the columns 9A, 9B, 9C, 9D of FIG. 2) and at the mouth of helical grooves provided in them. The columns 23A, 23B, forming a column group for descending movement, have a winding direction providing the balancing function already described in relation to the four columns 9A, 9B, 9C, 9D for raising the trolleys in the direction of the arrow 16, but with the difference that the rotation of these columns and the inclination of their helical grooves must be such as to cause the trolley to descend in the direction 7. This proceeds until the trolley wheels 20 are located in the straight channel in their horizontal guide rails 24, in the position assumed by the trolley 25 in FIG. 1.

From this position said trolley can again move horizontally in the direction of arrow 26 to terminate the cycle.

The cycle termination is achieved by a trolley 27 leaving the treatment chamber via an extension of the rail 24.

The presence of the gaps 19A, 19B, 19C, 19D (FIG. 5) is obviously a problem. This is solved according to the invention by providing, for supporting the trolley on the rails 18A, 18C a plurality of wheels 20 (FIG. 2) having their axis in an intermediate position between the axes 28 and 29 of the projecting pins 11A, 11C and 11B, 11D. In this manner, when each projecting pin leaves its helical groove in the respective column, it is subjected only to a small and negligible lowering which substantially does not prevent the plurality of wheels 20 from engaging the next section of upper rail 18A, 18B, 18C, in the sense that in this manner the trolley has a sufficient rigidity to maintain its ends projecting until they rest on the next rail section.

The invention has referred heretofore to rigid trolleys 4A, 4B, 4C, 25, in order to describe its essential details.

In a further embodiment of the invention, which renders it advantageously much more versatile, the trolleys are of different concept in that instead of being rigid they have a structure which is articulated in one direction and rigid in the other. This concept enables the trolleys to always remain within the treatment chamber 2, while still enabling the thermally treated object or product to be discharged to the outside.

This advantageously implies a considerable energy saving as there is no need for cyclic passage of the trolleys from the external temperature to the internal temperature of the chamber. It also advantageously implies contact between the product to be treated and support surfaces which are already heated to the required temperature.

With this articulated concept the individual trolleys are similar to sections of crawler-type tracks separate from each other although travelling in succession, separated by "distance steps" which are defined hereinafter and the smallness of which can be seen from FIG. 3.

An example of an articulated trolley is shown in outline in FIG. 1 and in detail in FIGS. 3, 7, 8A and 8B.

This trolley is formed from a certain number of chain links 32A and 32B (FIG. 7) arranged laterally in equal numbers and joined by transverse rods 31 and 33 defined by the width of the elongate trolley. To these rods there is also fixed a usual apertured mesh 30 to allow the trolley its unidirectional articulation and to form the "tray" surface, i.e. the surface on which the objects to be thermally treated are rested.

The purpose of the rods 33 and the analogous rods 33', 33" . . . is to connect the various links 32B, 32B', 32B" or 32A, 32A', 32A" together longitudinally, and also to connect these lateral links together transversely in pairs, i.e. 32A–32B; 32A'–32B'; 32A"–32B" etc.

In contrast the rods 31 do not act as a hinge pin between the longitudinal sequence of links 32A, 32A', 32A" but only as a transverse connection between the lateral links 32A–32B, 32A'–32B' . . . of the articulated trolley or tray. Rods 31 are also referred to as auxiliary rods.

The purpose of the rods 31 is essentially to reduce the distance between the various parallel rods in order to achieve a more solid configuration for the mesh 30 on which the product 1 is positioned.

Within each link 32 there is a wheel 20 mounted on the end of the various rods. For a more functional construction of the trolley, the longitudinal connection between the various links 32A, 32A', 32A" . . . (or between the various links 32B, 32B', 32B") is preferably made by specific hollow pins 34 (FIGS. 8A and 8B) in which the ends 35 of the rods 33 rest.

The ends of the rods 31 have the different shape indicated by 36. By adopting this difference, wheels 20A, 20D are mounted on the hollow pins 34, whereas wheels 20B, 20C are mounted directly on the ends of the rods.

These wheels are retained in a central position by usual spacers 37 and 38 respectively.

The various ends of the rods 31 and 33 (FIGS. 8A and 8B) are thickened at 39, 39' conceptually in spheroidal form (although cylindrical in practice) to allow rotation of the rods 31, 33 caused by the flexing of the rods 31 and 33 due to the weight of the objects 1 resting on the mesh 30. This is achieved since the rods 31,33 have a thickened end or collar 39,39' which contacts only a portion of an inner surface of the hollow pins 34 (see, e.g., FIG. 8). As such, vertical movement of the rods 31,33 is permitted without causing flexing of the pins 34 and deformation of the linkage. In this manner the rods can flex without angularly deforming the rows of lateral links 32, which can thus continue to maintain their correct position in the vertical plane. By this means, lateral or angular movements are not induced in the various wheels 20, which can hence slide correctly in their rails 5, and engage correctly with the drive wheels 40 (FIGS. 1, 3) provided for driving these articulated trolleys. Thus, the trolleys are provided with articulation means which prevent flexure of the trolley in a first direction when the trolley is supported only at its ends and permit flexure of the trolley in an opposite direction. The collars 39,39' constitute means for preventing the rods 31,33 from transmitting loading forces to the links 32, the collars 39,39' preferably being situated within wheels 20A,20B, etc., situated between the lateral walls 32Z of the links 32 as shown in FIG. 8A.

A number of toothed drive wheels 40A, 40B, 40C . . . are provided spaced apart by a distance such as to allow the constituent links of the various articulated trolleys 4 to move not only when they are wrapped about these wheels (such as the trolleys 4 and 27 of FIG. 1) but also when the trolleys have straightened out by virtue of their wheels resting on the rails 5, This distance is therefore such as to respect the pitch between the rods (trolley articulation axes), this being equal to the pitch of the teeth on the pitch circle 43 of said toothed wheels 40, 40A, 40B . . . (FIG. 3).

From FIG. 3 it can be seen how said trolleys achieve their articulation and how they are able to slide one following the other without being in mutual contact.

Figure 7:
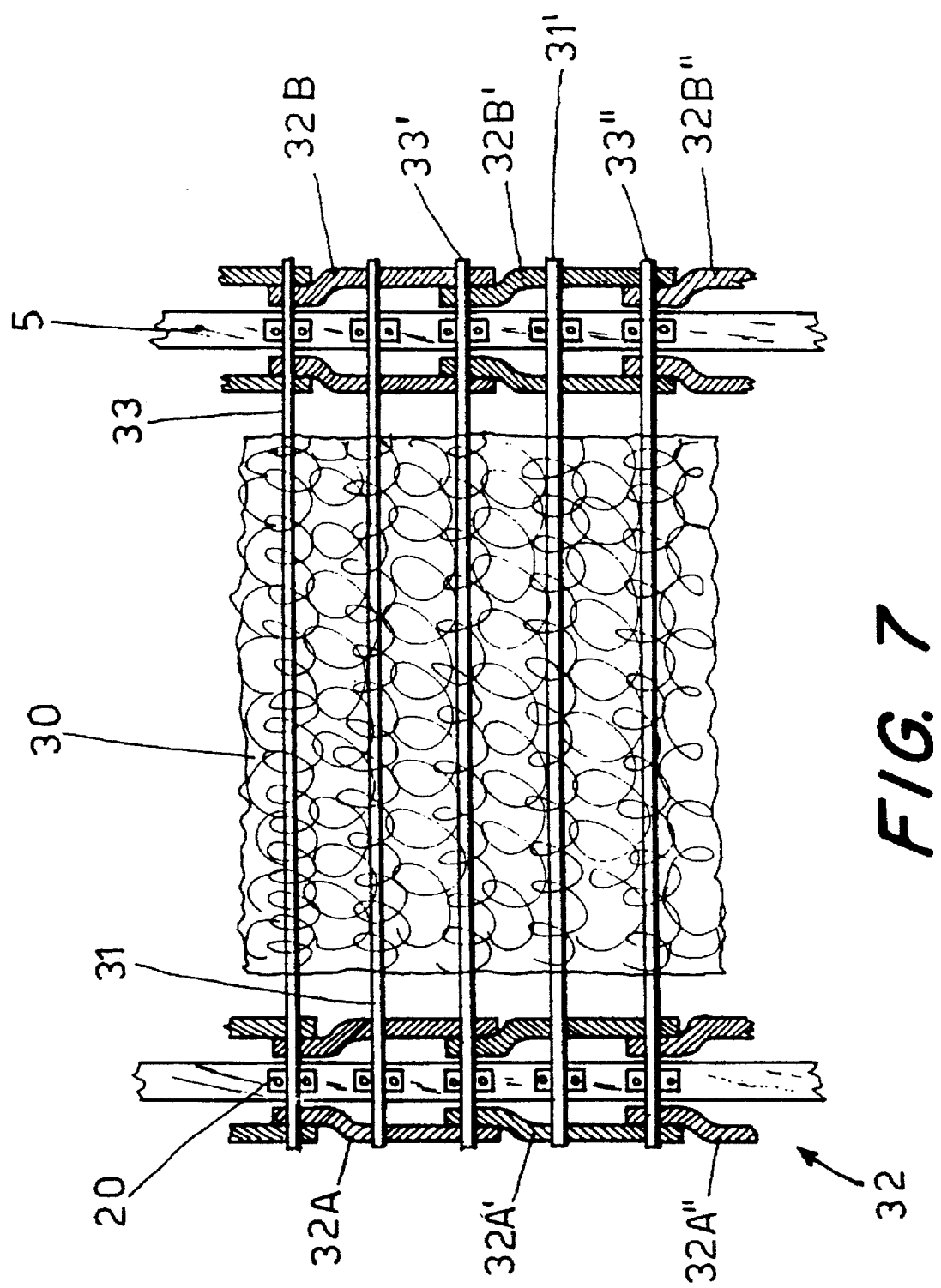
FIG. 7 is a conceptual example of the structure of an articulated tray viewed from above and shown in partial section.

The links 32 (A, B, . . . ) rest with their lower wheels 20 on their straight rail. 5 (FIG. 7). The walls 32Z (FIG. 3) of these links have a certain height 14 to act as a support both for the pins 33, 34, 35 and 31, 36 of said lower wheels 20, and for the spacer pins 44 of upper wheels 45 or 41 and for possible spacer pins 42 (see FIGS. 8A and 8B) provided to give rigidity to the box form of the individual links 32.

Each pair of constituent lateral walls 32Z of a link 32 is joined to the next pair in its lower region, in terms of the direction in which the product rests. More specifically, the lower front hole of each link is aligned with the lower rear hole of the next link in front of it on the specific hollow pin 34 cooperating with its rod 33. By connecting the various links 32 together in this manner a chain or crawler-type track is formed in which the hinge pins are at the bottom and have their axes coinciding with the axis of the rods 33.

Between the rods 33 there can be interposed one or more parallel rods 31, which do not act as hinges but simply as a further support for the support mesh 30 fixed to the rods 33.

At their ends, the rods 31 support the wheels 20B, which have to be spaced from the axis of the other wheels 20 by a length forming the pitch of the chain and equal to the pitch of the drive wheels 40 which engage it.

As said rods 31 do not act as hinge pins, in contrast to the fixed hollow pin 34 they have to be able to slide within the plane of the lateral walls 32Z of the links.

To allow this, the walls 32Z are provided with slots 56 of length such as to enable the rods 31 to rise until their axis (and hence the axis of the wheels 20B supported by them) coincides with the pitch circle 43 about which the chain or track turns, by curving and resting with the wheels 20 in the appropriate recesses or tooth roots in the toothed wheel 40.

From FIG. 3 it can be seen that two successive tooth roots of the toothed wheels 40 are engaged with the separate wheels 20 situated at the front end of one trolley and at the rear end of the next trolley, respectively. It can also be seen that the projecting pins 11B', 11A'; (dashed lines) pertaining to two successive articulated trolleys are coaxial to said wheels 20. With reference to FIGS. 3, 8A and 8B, the lateral walls 32Z of each link are also joined together by a pin 43 locking a spacer pin 44 on which an upper wheel 45 (or 41) is centrally supported.

The purpose of the spacer pin 44 is to act as a stop pin against which the shaped edge-recesses 46A, 46B of the pairs of walls 32Z forming the individual links 32 rest.

Shaped edge-recesses 46A and 46B constitute slots or arcuate recesses in the rear side of the lateral walls 32Z of each link 32 which are shaped so as to receive the spacer pin 44 of an adjacent link when in engagement therewith.

This contact between the transverse spacer pin 44 and the shaped edge-recesses 46A, 46B occurs both when the articulated trolleys 4 slide with their wheels 20 on straight rails and, in particular, when the trolleys are raised by the helically grooved columns engaging their projecting pins 11A, 11B, 11C, 11D.

Under these latter conditions a trolley is therefore formed which is flexurally rigid by the effect of its own weight and its end supports, and can therefore maintain its essential planarity during its rising stage 16 and descent stage 7 (FIG. 1).

Although essentially the trolley requires supports only at its ends, it still maintains all the aforesaid properties if further intermediate pairs of projecting, pins are provided to cooperate with further pairs of rotating helically grooved columns.

The advantage of trolleys which are flexible in one direction but rigid in the opposite direction is that they can behave as chain links and hence operate by recirculation. To reiterate, a complete trolley 4 is shown in FIG. 7 and provides a support surface for a mesh 30 on which food products are placed to be treated during passage of the trolley 4 through the chamber 2. The construction of the trolley 4 from a plurality of interconnected links 32 enables the trolley 4 to flex in one direction and prevents the trolley from flexing in an opposite direction. The flexing operation is shown in FIG. 3 and the structure which provides for the same is the fact that the trolley comprises the separable links 32. However, in the opposite direction, the spacer pin 44 situated at an upper portion of each link 32, engages with a correspondingly shaped recess 46A,46B on a preceding, adjacent link 32 thus preventing flexing in that direction.

However, as stated, these trolleys do not form an endless chain or track in the usual manner, but instead form separate chain sections which are independent of each other, and can hence be individually driven at different and/or variable speeds and accelerations.

It is therefore apparent that means must be defined which enable the discontinuous "chain" to be driven with continuous circulation.

These means consist of making said upper wheels 45 provided in each link travel along a curved track 47 (FIG. 3) concentric with the wheel 40 and located at such a distance therefrom as to prevent the lower wheels 20 separating from their seats at the roots of the teeth of the end toothed wheel 40, whether this is motorized or idle.

The trolley 4, 27 is hence compelled to curve and to invert its position and roll along a lower straight rail 48 (FIG. 1) via its upper wheels 45 (or 41, which are now located at the bottom). This continues until curved tracks 49, cooperating with the specific wheels 45 at their end, again return the articulated trolley to its operating position for loading the product 1. The four curved tracks 47 and 49 (two for each side) are hinged in a lower position 50 and 51 practically at the level of the lower rail 48. In this manner they can be lowered to allow the insertion (by usual means) of straight rail sections 52 and 53 connecting the operating rails 24, positioned within the treatment chamber 2, to rails 24A and 55 positioned externally.

Each individual articulated trolley can hence be transferred to other operating stations, without the arrangement of the products or objects resting on them undergoing alteration.

Again by this means, instead of being randomly loaded by the conveyor belt 3, the initial trolley 4 can be loaded in ordered arrangement as determined by the required technological process to be undergone and in accordance with external criteria, and then fed into the treatment chamber via the rails 55.

In the aforegoing description, it has been assumed that the plant is above ground level. However its operation is such that it can also advantageously operate below the ground, by firstly lowering the trolleys into an underground treatment chamber and then raising them. This is particularly advantageous in the case of products to be deep-frozen in that, as is well known, cold air has a higher specific gravity than hot air and can hence remain in the bottom of the refrigeration chamber without losing energy by escaping to the outside.

Under particular operating conditions the articulated trolleys could bend because of the weight of the objects resting on them. To prevent this bending causing damaging contact between the trolleys, or between the trolleys and the underlying products, the rotating screw columns can have a variable pitch to reflect the minimum spacing which the various trolleys have to have when in their overlying configuration. This variable pitch of the helix is advantageously useful in those cases in which delicate products demand minimum acceleration (for example in the case of liquid or cream to be solidified) at the beginning of the cycle, whereas they can withstand maximum acceleration at the end of the cycle (for example when the liquid has solidified).

A further advantage of this variable pitch of the rotating screw columns is to accommodate in the minimum possible space those products or objects of variable volume, such as bread loaves, bread cakes and other foods which leaven. Such products have a small initial volume, which increases considerably as they remain in the oven, so that the trolleys on which they rest must overlie each other at different minimum distances apart depending on the time for which the products have been in the oven. This problem can be advantageously solved by using screw columns of variable pitch.

The described movement by screw columns can also be applied to the lowering and raising of trolleys in underground chambers, even without transfer between different groups of columns. To effect this, the lowering is achieved by rotating the screws in one direction and the raising by rotating them in the opposite direction.

This facility for reversing the movement refers not only to the raising and lowering by the screws, but also to the plant overall, both in relation to the mechanical design of the trolleys and the equipment provided for their movement, and in relation to the symmetry of the plant achieved.

I claim:

1. An apparatus for passing food products through a chamber in which the food products are treated, comprising at least one elongate support trolley for supporting food products, said at least one trolley having longitudinal ends and lifting elements arranged thereat, said at least one trolley comprising a plurality of links arranged in the longitudinal direction of said at least one trolley, adjacent ones of said links being aligned with each other to thus form a continuous structure of said at least one trolley, articulation means, said adjacent ones of said links being articulated to one another by said articulation means, first drive means for moving said at least one trolley in a longitudinal direction within said chamber, and second drive means for moving said at least one trolley in a substantially vertical direction in said chamber, said second drive means engaging said lifting elements at said ends of said at least one trolley and raising said lifting elements, said second drive means comprising rotatable screws having helical openings, said first drive means moving said at least one trolley in the longitudinal direction such that said lifting elements are positionable within said openings of said screws whereby upon rotation of said screws, said at least one trolley is moved in the vertical direction.

2. The apparatus of claim 1, wherein said first drive means comprise rotatable toothed wheels and support rails on which said at least one trolley moves in the longitudinal direction, said at least one trolley further comprising wheels cooperating with said toothed wheels of said first drive means to cause movement of said at least one trolley along said rails in the longitudinal direction upon rotation of said toothed wheels.

3. The apparatus of claim 2, wherein said support rails have a channel therein in which said wheels of said at least one trolley are positioned.

4. The apparatus of claim 2, wherein said at least one trolley has sides and comprises a plurality of links arranged on both of said sides, each of said links comprising opposed lateral walls having an upper portion, a transverse pin connecting said upper portions of said opposed lateral walls, and a wheel arranged on said transverse pin between said lateral walls, first and second ones of said toothed wheels of said first drive means being arranged in a row at first and second ends thereof, respectively, the apparatus further comprising at least one guide for guiding the turning of said at least one trolley about said first and second toothed wheels of said first drive means arranged at said first and second ends of said row, respectively, such that a principal direction of movement of said at least one trolley is changed, said wheels on said transverse pins engaging with said at least one guide.

5. The apparatus of claim 4, wherein said at least one guide has a bottom portion and comprises a hinge at said bottom portion for rotation thereabout, said chamber having an end, the apparatus further comprising additional support rails aligning with said support rails at said end of said chamber after said at least one guide has been rotated about said hinge such that said at least one trolley is removable from said chamber.

6. The apparatus of claim 4, wherein said links further comprise a transverse spacer connecting said opposed lateral walls.

7. The apparatus of claim 1, wherein said articulation means comprise a spacer pin arranged at an upper portion of each of said links and which cooperates with a recess at an upper region of an adjacent one of said links.

8. The apparatus of claim 1, wherein said articulation means comprise a plurality rods, one of said plurality of parallel rods extending through each pair of adjacent ones of said links such that said rods constitute hinge pins about which said adjacent links in said pairs are pivoted.

9. The apparatus of claim 8, wherein said at least one trolley further comprises auxiliary rods arranged parallel to and between said plurality of parallel rods and extending through said links such that at least one of said auxiliary rods is encompassed within each of said links, said auxiliary rods and said plurality of parallel rods having wheels arranged thereon.

10. The apparatus of claim 9, wherein said at least one trolley further comprises means for preventing said plurality of parallel rods and said auxiliary rods from transmitting loading forces to said links, said preventing means comprising an enlarged end of each of said plurality of parallel rods and said auxiliary rods being situated within said wheels of said at least one trolley.

11. The apparatus of claim 9, wherein said links comprise side walls and slots arranged in said side walls, said auxiliary rods being positioned and freely movable in said slots.

12. The apparatus of claim 9, wherein said at least one trolley further comprises a support surface for supporting said food products, said support surface being defined by an apertured mesh attached to said plurality of parallel rods and said auxiliary rods.

13. The apparatus of claim 1, further comprising means for rotating said screws to align said openings of said screws with said lifting elements of said at least one trolley and to balance said at least one trolley during movement in the vertical direction, said openings in said screws having the same inclination such that upon rotation of said screws having said lifting elements positioned therein, said lifting elements are moved in a uniform vertical movement.

14. The apparatus of claim 1, wherein said at least one trolley comprises a first trolley and a second trolley, said screws being rotated such that said first trolley is moved vertically by said screws a distance of at least the height of said second trolley before said second trolley is moved longitudinally into a position in which said lifting elements of said second trolley engage with said openings in said screws.

15. The apparatus of claim 1, wherein said screws have a variable pitch such that the speed of the vertical movement of said at least one trolley is regulatable.

16. The apparatus of claim 1, further comprising loading means for loading said food products onto said at least one trolley, said loading means comprising a feed belt partially extending into said chamber, said food products being directed from said feed belt onto said at least one trolley.

17. The apparatus of claim 1, wherein said second drive means comprise a first set of said screws for moving said at least one trolley in an upward vertical direction and a second set of said screws for moving said at least one trolley in a downward vertical direction, the apparatus further comprising third drive means for moving said at least one trolley in a longitudinal direction after said at least one trolley has been moved vertically upward by said first set of screws to a position in which said lifting elements of said at least one trolley engage with said openings of said second set of screws.

18. The apparatus of claim 1, further comprising guide means for guiding said at least one trolley during the vertical movement of said at least one trolley.

19. An apparatus for passing food products through a chamber in which the food products are treated, comprising
- at least one support trolley for supporting food products, said at least one trolley having longitudinal ends and projecting pins arranged at said longitudinal ends and comprising a plurality of links, each of said plurality of links comprising wheels,
- horizontal drive means for moving said at least one trolley in a substantially horizontal direction within said chamber, said horizontal drive means comprising rotatable toothed wheels and support rails on which said at least one trolley moves in the horizontal direction, said wheels of said links of said at least one trolley cooperating with said toothed wheels of said horizontal drive means to cause the horizontal movement of said at least one trolley along said rails, and
- vertical drive means for moving said at least one trolley in a substantially vertical direction in said chamber, said vertical drive means comprising rotatable screws each having a helical groove therein, such that upon movement of said at least one trolley in the horizontal direction, said projecting pins of said at least one trolley are positionable within said helical grooves and upon rotation of said screws, said at least one trolley is moved in the vertical direction.

20. An apparatus for passing food products through a chamber in which the food products are treated, comprising
- at least one elongate support trolley for supporting food products, said at least one trolley having longitudinal ends and lifting elements arranged thereat, said at least one trolley comprising a plurality of links extending in the longitudinal direction of said at least one trolley, adjacent ones of said links being aligned with each other to thus form a continuous structure of said at least one trolley,
- articulation means for articulating said adjacent ones of said links to one another,
- first drive means for moving said at least one trolley in a longitudinal direction within said chamber, said first drive means comprising rotatable toothed wheels and support rails on which said at least one trolley moves in the longitudinal direction, said at least one trolley further comprising wheels cooperating with said toothed wheels of said first drive means to cause movement of said at least one trolley along said rails in the longitudinal direction, and
- second drive means for moving said at least one trolley in a substantially vertical direction in said chamber, said second drive means comprising means for engaging said lifting elements at said ends of said at least one trolley and raising said lifting elements.

21. An apparatus for passing food products through a chamber in which the food products are treated, comprising
- at least one elongate support trolley for supporting food products, said at least one trolley having longitudinal ends and lifting elements arranged thereat, said at least one trolley comprising a plurality of links extending in the longitudinal direction of said at least one trolley, adjacent ones of said links being aligned with each other to thus form a continuous structure of said at least one trolley,
- articulation means for articulating said adjacent ones of said links to one another, said articulation means comprising a spacer pin arranged at an upper portion of each of said links and which cooperates with a recess at an upper region of adjacent ones of said links,
- first drive means for moving said at least one trolley in a longitudinal direction within said chamber, and
- second drive means for moving said at least one trolley in a substantially vertical direction in said chamber, said second drive means comprising means for engaging said lifting elements at said ends of said at least one trolley and raising said lifting elements.

22. An apparatus for passing food products through a chamber in which the food products are treated, comprising
- at least one elongate support trolley for supporting food products, said at least one trolley having longitudinal ends and lifting elements arranged thereat, said at least one trolley comprising a plurality of links extending in the longitudinal direction of said at least one trolley, adjacent ones of said links being aligned with each other to thus form a continuous structure of said at least one trolley,
- articulation means for articulating said adjacent ones of said links to one another, said articulation means comprising a plurality of parallel rods, one of said plurality of parallel rods extending through each of said adjacent ones of said links such that said rods constitute hinge pins about which said links are pivoted, said at least one trolley further comprising auxiliary rods arranged parallel to and between said plurality of parallel rods and extending through said links such that at least one of said auxiliary rods is encompassed within each of said links, said auxiliary rods and said plurality of parallel rods having wheels arranged thereon, first drive means for moving said at least one trolley in a longitudinal direction within said chamber, and second drive means for moving said at least one trolley in a substantially vertical direction in said chamber, said second drive means comprising means for engaging said lifting elements at said ends of said at least one trolley and raising said lifting elements.

23. An apparatus for passing food products through a chamber in which the food products are treated, comprising at least one elongate support trolley for supporting food products, said at least one trolley having longitudinal ends and lifting elements arranged thereat, said at least one trolley comprising a plurality of links extending in the longitudinal direction of said at least one trolley, adjacent ones of said links being aligned with each other to thus form a continuous structure of said at least one trolley, articulation means for articulating said adjacent ones of said links to one another, first drive means for moving said at least one trolley in a longitudinal direction within said chamber, second drive means for moving said at least one trolley in a substantially vertical direction in said chamber, said second drive means comprising means for engaging said lifting elements at said ends of said at least one trolley and raising said lifting elements, and loading means for loading said food products onto said at least one trolley, said loading means comprising a feed belt partially extending into said chamber, said food products being directed from said feed belt onto said at least one trolley.

* * * * *